US010986172B2

(12) United States Patent
Kurhe et al.

(10) Patent No.: US 10,986,172 B2
(45) Date of Patent: Apr. 20, 2021

(54) CONFIGURABLE CONNECTION RESET FOR CUSTOMIZED LOAD BALANCING

(71) Applicant: Walmart Apollo, LLC, Bentonville, AR (US)

(72) Inventors: Laxmikant Kurhe, Karnataka (IN); Suraj Menon, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/547,038

(22) Filed: Aug. 21, 2019

(65) Prior Publication Data
US 2020/0404047 A1 Dec. 24, 2020

(30) Foreign Application Priority Data
Jun. 24, 2019 (IN) .............................. 201941025036

(51) Int. Cl.
*G06F 15/16* (2006.01)
*H04L 29/08* (2006.01)
*H04L 12/26* (2006.01)
*H04L 12/24* (2006.01)

(52) U.S. Cl.
CPC .......... *H04L 67/1004* (2013.01); *H04L 41/06* (2013.01); *H04L 43/16* (2013.01); *H04L 67/14* (2013.01)

(58) Field of Classification Search
CPC ..... H04L 67/1004; H04L 41/06; H04L 43/16; H04L 67/14
See application file for complete search history.

(56) References Cited

U.S. PATENT DOCUMENTS 6,601,084 B1 * 7/2003 Bhaskaran .............. G06F 9/505
 709/223
6,880,156 B1 4/2005 Landherr et al.
(Continued)

OTHER PUBLICATIONS

John Carl Villenueva, "Managed File Transfer and Network Solutions", JSCAPE, Active-Active vs Active-Passive High Availability Cluster, https://www.jscape.com/blog/active-active-vs-active-passive-high-availability-cluster, Jun. 23, 2015, 6 pages.
(Continued)

*Primary Examiner* — Moustafa M Meky
*Assistant Examiner* — Thorne E Waugh

(57) ABSTRACT

Examples provide a configurable connection reset system for customized distribution of incoming traffic to a plurality of servers. The connection reset component routes incoming service requests to active servers based on server performance, configurable server failure criteria, user-selected inactive threshold wait time-period for each server and per-client distribution configurations, including server priorities and user-selected distribution methodology or combination of distribution methodologies. A configurable wait time-period is assigned to each inactive server removed from a distribution rotation for the incoming traffic. A next received request to the next available server for the identified client. An inactive server is updated to active status and returned to the distribution rotation after expiration of the configurable wait time-period.

20 Claims, 9 Drawing Sheets

(56) References Cited

U.S. PATENT DOCUMENTS

| | | | |
|---|---|---|---|
| 7,774,470 B1* | 8/2010 | Sanders | H04L 63/1483 709/226 |
| 7,865,596 B2 | 1/2011 | Grosner et al. | |
| 8,177,132 B1* | 5/2012 | Bohen | G07D 11/30 235/385 |
| 8,493,858 B2* | 7/2013 | Kamath | H04L 67/1012 370/235 |
| 8,775,628 B2 | 7/2014 | Francis et al. | |
| 8,949,410 B2 | 2/2015 | Patel et al. | |
| 9,197,699 B2 | 11/2015 | Yevmenkin et al. | |
| 9,331,891 B2 | 5/2016 | Ko et al. | |
| 9,549,152 B1* | 1/2017 | Nayyar | H04N 7/148 |
| 10,484,337 B2* | 11/2019 | Subbarayan | H04L 69/329 |
| 2004/0162901 A1* | 8/2004 | Mangipudi | H04L 41/5025 709/225 |
| 2004/0267930 A1* | 12/2004 | Giulio | H04L 67/1008 709/225 |
| 2010/0107172 A1 | 4/2010 | Calinescu et al. | |
| 2010/0153524 A1* | 6/2010 | Rehm | H04L 67/1031 709/221 |
| 2011/0078303 A1* | 3/2011 | Li | H04L 67/1012 709/224 |
| 2012/0239725 A1 | 9/2012 | Hartrick et al. | |
| 2013/0111467 A1* | 5/2013 | Sundararaj | G06F 9/505 717/176 |
| 2014/0095592 A1 | 4/2014 | Hartrick et al. | |
| 2014/0266608 A1* | 9/2014 | Jones | G06Q 10/08 340/8.1 |
| 2017/0264486 A1* | 9/2017 | Angell | H04L 41/0806 |

OTHER PUBLICATIONS

Unknown, "Server Load-Balancing Guies vA3(1.0), Cisco ACE 4700 Series Application Control Engine Applicance", https://www.cisco.com/c/en/us/td/docs/app_ntwk_services/data_center_app_services/ace_appliances/vA3_1_0/configuration/slb/guide/slbgd/rsfarms . . . , Oct. 27, 2013, pp. 1-58.

* cited by examiner

FIG. 9

| AlgoStrategy | Servers | All hosts working | All hosts working except host1 and host4 | All hosts down except host2 |
|---|---|---|---|---|
| Round Robin 902 | Host1<br>Host2<br>Host3<br>Host4<br>Host5 | Run-1 output: Host1<br>Run-2 output: Host2<br>Run-3 output: Host3<br>Run-4 output: Host4<br>Run-5 output: Host5<br>Run-6 output: Host1<br>Run-7 output: Host2<br>Run-8 output: Host3<br>Run-9 output: Host4<br>and so on... | Run-1 output: Host2<br>Run-2 output: Host3<br>Run-3 output: Host5<br>Run-4 output: Host2<br>Run-5 output: Host3<br>Run-6 output: Host5<br>Run-7 output: Host2<br>Run-8 output: Host3<br>Run-9 output: Host5<br>and so on... | Run-1 output: Host2<br>Run-2 output: Host2<br>Run-3 output: Host2<br>Run-4 output: Host2<br>Run-5 output: Host2<br>Run-6 output: Host2<br>Run-7 output: Host2<br>Run-8 output: Host2<br>Run-9 output: Host2<br>and so on... |
| Priority Based Where Host2 has highest priority and all others are the same 904 | Host1<br>Host2<br>Host3<br>Host4<br>Host5 | Run-1 output: Host2<br>Run-2 output: Host1<br>Run-3 output: Host3<br><br>If by this time Host2 is available<br><br>Run-4 output: Host2<br>Run-5 output: Host4<br>Run-6 output: Host5<br><br>If by this time Host2 is available<br><br>Run-7 output: Host2<br>Run-8 output: Host1<br>Run-9 output: Host3<br>and so on... | Run-1 output: Host2<br>Run-2 output: Host3<br>Run-3 output: Host5<br><br>If by this time Host2 is available<br><br>Run-4 output: Host2<br>Run-5 output: Host3<br>Run-6 output: Host5<br><br>If by this time Host2 is available<br><br>Run-7 output: Host2<br>Run-8 output: Host3<br>Run-9 output: Host5<br>and so on... | Run-1 output: Host2<br>Run-2 output: Host2<br>Run-3 output: Host2<br>Run-4 output: Host2<br>Run-5 output: Host2<br>Run-6 output: Host2<br>Run-7 output: Host2<br>Run-8 output: Host2<br>Run-9 output: Host2<br>and so on... |

CONFIGURABLE CONNECTION RESET FOR CUSTOMIZED LOAD BALANCING

BACKGROUND

Clients can send hundreds or thousands of service requests to servers each day. If too many of the service requests are received by the same server, the server can experience lag time responding to the requests or cause denial of service due to insufficient resources to respond to all the requests received simultaneously. A load balancer can be used to throttle or reduce the number of service requests going to each server to reduce lag time and service denials. However, these load balancers typically throttle requests in accordance with a predetermined schedule without regard to client preferences or dynamic state of various servers receiving the request. This can lead to inefficient routing of service requests, lack of flexibility and sub-optimal resource utilization.

SUMMARY

Some examples provide a system for customized distribution of incoming traffic to a plurality of servers. The system includes at least one processor communicatively coupled to a memory. A communications interface component receives a plurality of service requests from a plurality of client devices via a network. A status component analyzes dynamic server performance data associated with each server in a plurality of servers in real-time with a set of user-configured threshold failure criteria to identify a status of each server. A data storage device stores a status of each server in the plurality of servers. The status comprising an active server status or an inactive server status. A connection manager assigns a configurable wait time-period to each server in the plurality of servers having an inactive status. Each server having an inactive status is removed from a distribution rotation for the configurable wait time-period. A selection component identifies a next available server in a set of active servers based on a per-client set of user-selected distribution configurations associated with an identified client and status of each server in the plurality of servers on condition a request is received from the identified client. The per-client user-selected distribution configurations including a set of per-client server priorities assigned to the plurality of servers and a per-client selected rotation methodology associated with the identified client. A routing component sends a next received request to the identified next available server.

Other examples provide a computer-implemented method for customized distribution of incoming traffic to a plurality of servers. A service request is received from an identified client device via a network. A status component analyzes dynamic server performance data associated with each server in a plurality of servers in real-time with a set of user-configured threshold failure criteria to update a set of available servers based on a status of each server. A selection component identifies a next available server in the set of active servers based on a set of user-selected distribution configurations associated with the identified client, the user-selected distribution configurations including a selected type of rotation methodology associated with the identified client. A routing component sends the service request to the identified next available server.

Still other examples provide a computer storage device having computer-executable instructions for performing customized distribution of incoming traffic to a plurality of servers by a connection reset component. The connection reset component receives a plurality of service requests from a plurality of client devices via a network. The connection reset component analyzes dynamic server performance data associated with each server in a plurality of servers in real-time using a set of user-configured threshold failure criteria to identify a status of each server. The connection reset component removes a set of inactive servers from a list of active servers based on the server status of each server in the plurality of servers. A configurable wait time-period is assigned to each server in the plurality of servers having an inactive status. Each inactive status server is removed from a distribution rotation for the configurable wait time-period. The connection reset component selects a next available server from a set of active servers on the list of active servers based on the distribution rotation and a per-client set of user-selected distribution configurations associated with an identified client on condition a request is received from the identified client. The request is sent to the selected next available server.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 9 is an exemplary table illustrating distribution of requests to available servers in accordance with a selected distribution rotation methodology.

Corresponding reference characters indicate corresponding parts throughout the drawings.

DETAILED DESCRIPTION

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as 'In at least some examples, . . . . For brevity and clarity of presentation, this implied leading clause is not repeated ad nauseum.

Referring to the figures, examples of the disclosure enable customized load balancing using connection reset methodology and per-client configuration data. In some examples, a connection reset component routes requests to active servers based on per-server failure criteria, threshold wait time-period for inactive status and per-client distribution configurations, including a user-selected type of distribution rotation methodology. The connection reset component enables customized routing of service requests to reduce service lag time, improve system resource utilization and enable improved flexibility in request routing. The connection reset component further reduces processor load on servers while improving service response speed.

Figure 1:
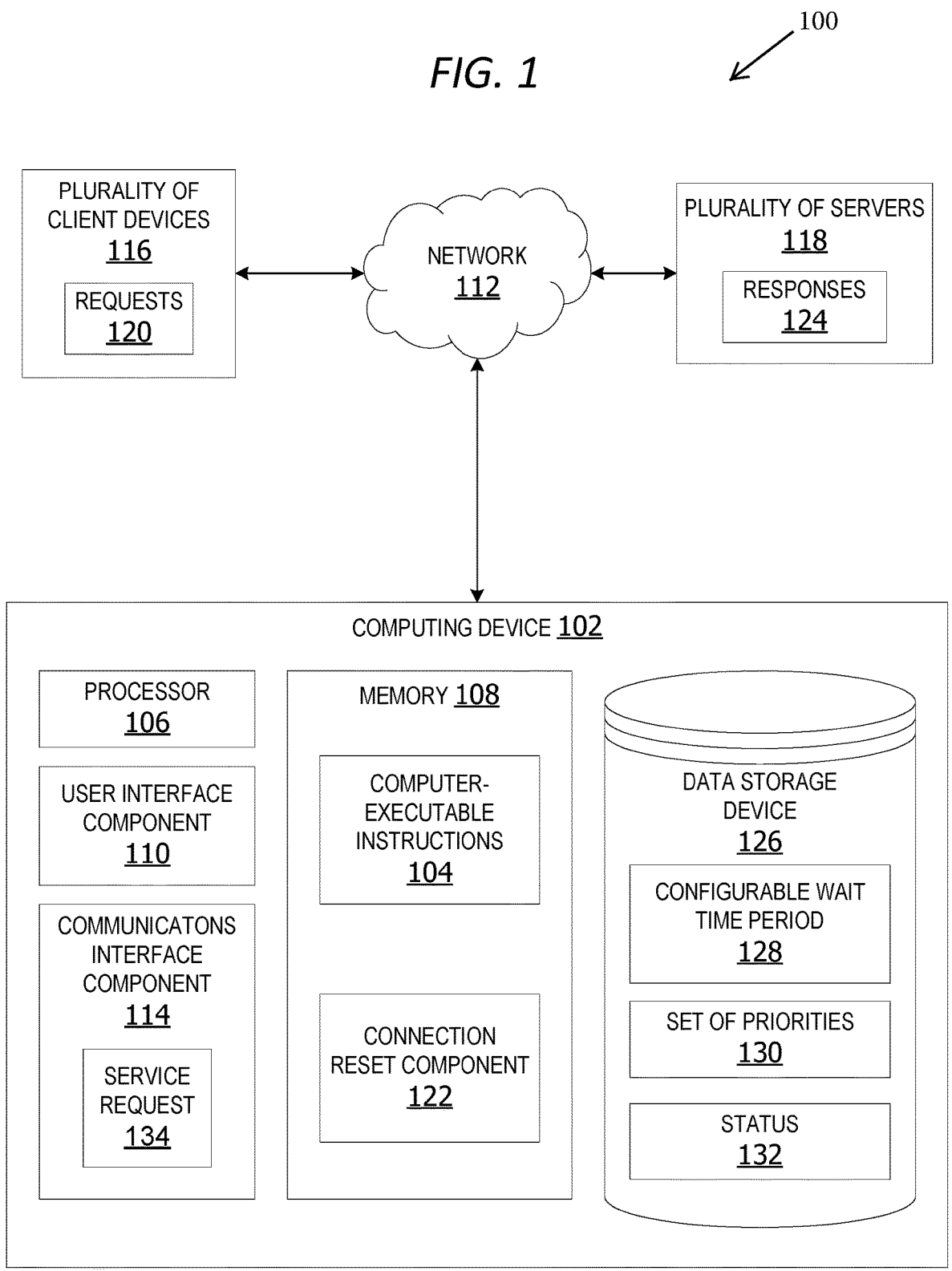
FIG. 1 is an exemplary block diagram illustrating a system for load balancing using customized connection reset.

Referring again to FIG. 1, an exemplary block diagram illustrates a system 100 for a system for load balancing using customized connection reset. In the example of FIG. 1, the computing device 102 represents any device executing computer-executable instructions 104 (e.g., as application programs, operating system functionality, or both) to implement the operations and functionality associated with the computing device 102. The computing device 102 in some examples includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106 and a memory 108. The computing device 102 in other examples includes a user interface component 110.

The processor 106 includes any quantity of processing units and is programmed to execute the computer-executable instructions 104. The computer-executable instructions 104 is performed by the processor 106, performed by multiple processors within the computing device 102 or performed by a processor external to the computing device 102. In some examples, the processor 106 is programmed to execute instructions such as those illustrated in the figures (e.g., FIGS. 7 and 8).

The computing device 102 further has one or more computer-readable media such as the memory 108. The memory 108 includes any quantity of media associated with or accessible by the computing device 102. The memory 108 in these examples is internal to the computing device 102 (as shown in FIG. 1). In other examples, the memory 108 is external to the computing device (not shown) or both (not shown). The memory 108 can include read-only memory and/or memory wired into an analog computing device.

The memory 108 stores data, such as one or more applications. The applications, when executed by the processor 106, operate to perform functionality on the computing device 102. The applications can communicate with counterpart applications or services such as web services accessible via a network 112. In an example, the applications represent downloaded client-side applications that correspond to server-side services executing in a cloud.

In other examples, the user interface component 110 includes a graphics card for displaying data to the user and receiving data from the user. The user interface component 110 can also include computer-executable instructions (e.g., a driver) for operating the graphics card. Further, the user interface component 110 can include a display (e.g., a touch screen display or natural user interface) and/or computer-executable instructions (e.g., a driver) for operating the display. The user interface component 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 102 in one or more ways.

The network 112 is implemented by one or more physical network components, such as, but without limitation, routers, switches, network interface cards (NICs), and other network devices. The network 112 is any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface component 114. The communications interface component 114 includes a network interface card and/or computer-executable instructions (e.g., a driver) for operating the network interface card. Communication between the computing device 102 and other devices, such as but not limited to a plurality of client devices 116 and/or a plurality of servers 118, can occur using any protocol or mechanism over any wired or wireless connection. In some examples, the communications interface component 114 is operable with short range communication technologies such as by using near-field communication (NFC) tags.

A client device in the plurality of client devices 116 can be implemented as any computing device executing computer-executable instructions. A client device can be implemented as a mobile computing device, such as, but not limited to, a wearable computing device, a mobile telephone, laptop, tablet, computing pad, netbook, gaming device, and/or any other portable device. A client device includes at least one processor and a memory. A client device can also include a user interface component.

The plurality of client devices 116 in some examples includes one or more software applications sending a plurality of requests 120 to a connection reset component 122. The connection reset component 122 routes the requests to one or more servers in the plurality of servers 118. The one or more servers generate one or more responses 124 back to the client devices in response to the requests 120. A request can be an application programming interface (API) call, a hypertext transfer protocol (HTTP) call that goes to a server, or any other type of request.

In other examples, the plurality of servers 118 can include one or more cloud servers. A cloud server is a logical server providing services to the computing device 102 or other clients, such as, but not limited to, the plurality of client devices 116. A cloud server is hosted and/or delivered via the network 112. In some non-limiting examples, the cloud server is associated with one or more physical servers in one or more data centers. In other examples, the cloud server is associated with a distributed network of servers.

In some examples, a server responding to multiple requests from one or more clients (applications) can become overwhelmed by the volume of such requests (incoming traffic). Additional servers are included to share the traffic among multiple servers to avoid the single server going down due to heavy usage. When the load is shared among multiple servers, traffic is redirected to individual servers in accordance with a distribution methodology based on customized configurations, server state, server resource capacity and/or per-client configurable options. The custom conditions specify how traffic is shared between servers, define/select load share algorithms, set individual server status as active/inactive and/or auto-retry capability to move servers from active to inactive status.

The system 100 can optionally include a data storage device 126 for storing data, such as, but not limited to a configurable wait time-period 128 data, user-selected set of priorities 130 and/or server status 132 for each server in the plurality of servers 118. The threshold wait time-period 128 is an amount of time a server remains inactive before being returned to the list of active servers accepting service requests from clients.

The threshold wait time-period 128 can be any user-selected time-period. In one non-limiting example, the threshold wait time-period 128 is one minute. In another example, the threshold wait time-period 128 is thirty seconds. In still another example, the threshold wait time-period 128 is five minutes. The threshold wait time-period 128 can be any other configurable time-period.

The set of priorities 130 is a set of per-client server priorities indicating which server on the list of available servers should have higher priority for receiving service requests. The status 132 data is data indicating whether a server is an active server or an inactive server. A server having an inactive status is not receiving service requests from clients (unavailable for responding to requests).

The data storage device 126 can include one or more different types of data storage devices, such as, for example, one or more rotating disks drives, one or more solid state drives (SSDs), and/or any other type of data storage device. The data storage device 126 in some non-limiting examples includes a redundant array of independent disks (RAID) array. In other examples, the data storage device 126 includes a database, such as, but not limited to, the database 600 in FIG. 6 below.

The data storage device 126 in this example is included within the computing device 102, attached to the computing device, plugged into the computing device or otherwise associated with the computing device 102. In other examples, the data storage device 126 includes a remote data storage accessed by the computing device via the network 112, such as a remote data storage device, a data storage in a remote data center, or a cloud storage.

The memory 108 in some examples stores one or more computer-executable components, such as, but not limited to, the connection reset component 122. In some examples, a service request 134 is received via the communications interface component 114.

In some examples, the connection reset component 122 provides capability to share traffic among multiple individual servers from a defined set of servers for better availability. Throughout an application lifecycle, there is always a need to transfer information between two endpoints/servers. Such communication happens in terms of requests that are triggered between servers. The service request 134 can be an application programming interface (API), service, a get request (GET), a post request (POST) or any other kind of request.

The connection reset component 122 identifies a set of active servers based on the status 132 of each server. The connection reset component 122 identifies the next available server in the set of active servers based on the user-selected set of priorities 130 and the selected type of distribution rotation methodology associated with the client device that sent the service request 134. The connection reset component 122 sends the service request 134 to the selected next available server in the set of active servers customized based on configurations for the identified client device originating the service request 134.

In some examples, the connection reset component 122 enables a user to balance traffic flowing to multiple servers to make sure that a single server or set of servers are not overloaded with heavy traffic. The connection reset component 122 routes requests to active state servers which are actually functional and leave inactive servers from load sharing calculations.

The connection reset component 122 maintains state of each server based on the servers real-time performance data and only sends traffic to active servers. Inactive servers are kept out of the rotation for a configurable time-period after which the servers are checked again for active state. After expiration of the time-period, the server is added back to the active server list.

In the example shown in FIG. 1, the client devices and the server devices are located on separate physical devices from the computing device 102. In other examples, the client originating the service request(s) and the servers responding to the service request(s) can be located on the same computing device 102.

Figure 2:
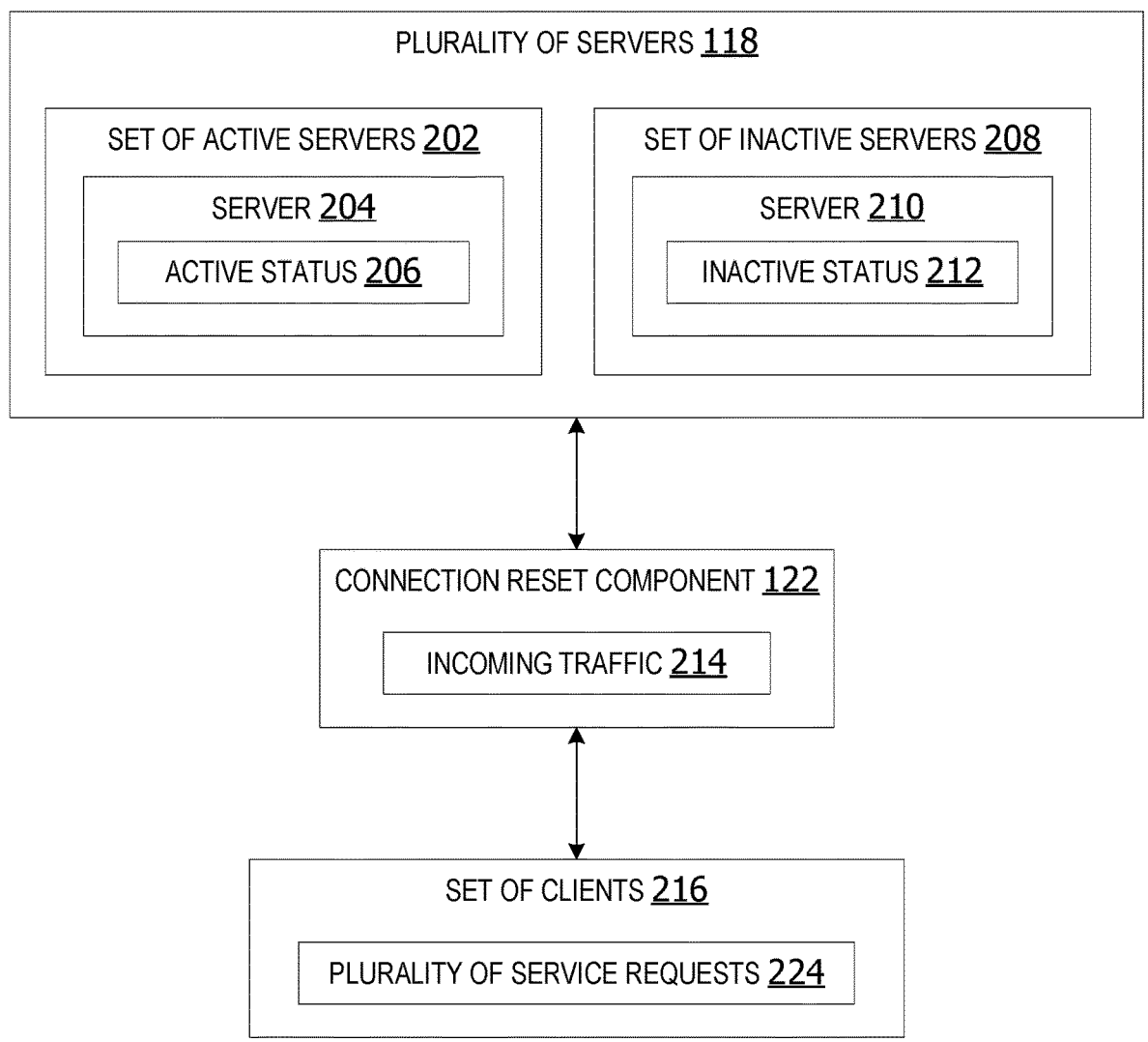
FIG. 2 is an exemplary block diagram illustrating a system including a connection reset component routing incoming traffic to a plurality of servers.

FIG. 2 is an exemplary block diagram illustrating a system including a connection reset component 122 routing incoming traffic to a plurality of servers 118. The plurality of servers 118 includes a set of one or more active servers 202. An active server in the set of active servers 202 is a server 204 which has an active status 206. The active or inactive status are determined based on real-time server performance data.

The plurality of servers 118 can also include a set of one or more inactive servers 208. An inactive server in the set of inactive servers 208 is a server 210 having an inactive status 212.

A connection reset component 122 receives incoming traffic 214 from a set of one or more clients 216. The incoming traffic 214 includes requests traffic (volume of requests). A client in the set of clients 216 can be a physical client device, an application or other software client. The set of clients 216 generates a plurality of service requests 224, such as, but not limited to, the service request 134 in FIG. 1.

Figure 3:
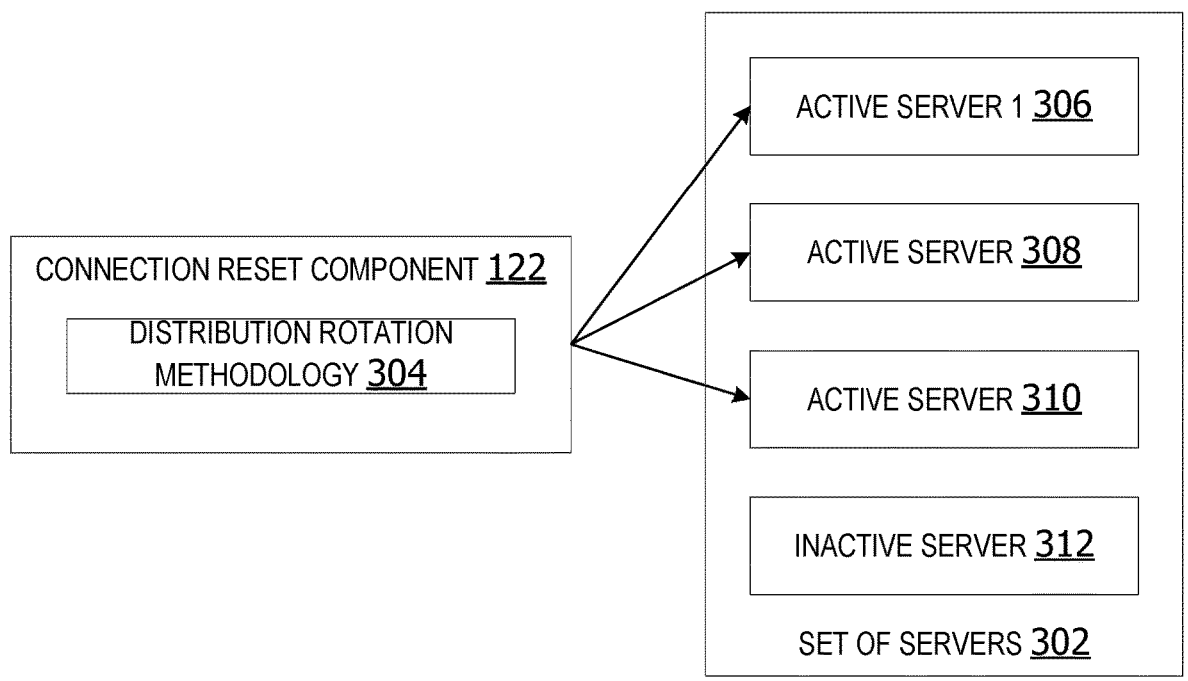
FIG. 3. is an exemplary block diagram illustrating a connection reset component routing service requests to active servers in accordance with a distribution algorithm.

FIG. 3. is an exemplary block diagram illustrating a connection reset component 122 routing service requests to active servers in accordance with a distribution rotation methodology 304. In this example, the set of servers 302 includes an active server 306, an active server 308 and an active server 310 available for servicing incoming client requests. An active server is a server in functional mode and ready to accept/respond to new requests.

The inactive server 312 in this example is a server in the set of servers 302 which does not receive client requests from the connection reset component 122. An inactive server is a server that is not in functional mode and is not ready to accept/respond to new requests. In other words, the inactive server 312 is taken out of the server rotation until the servers status changes from inactive back to active status.

Figure 4:
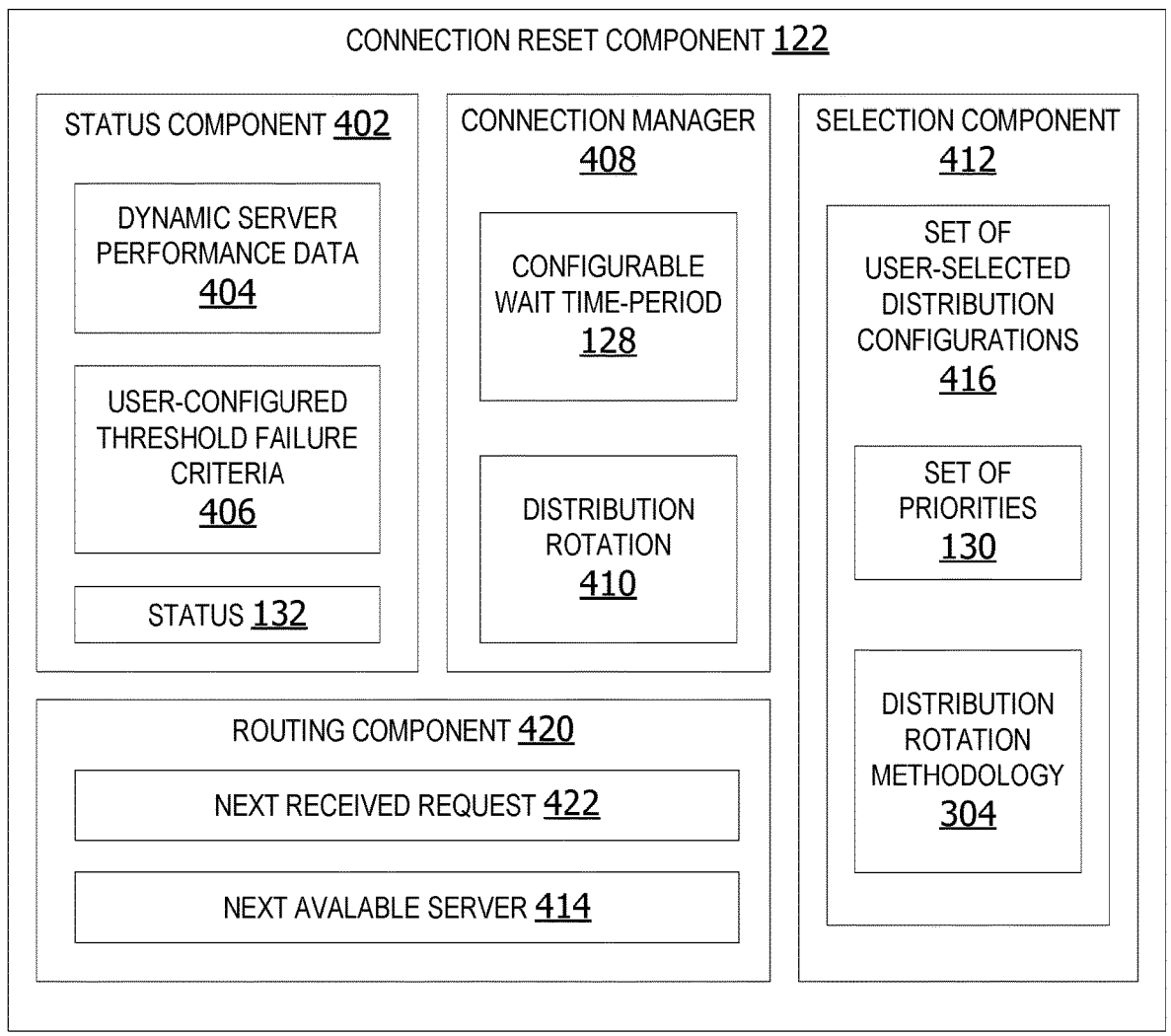
FIG. 4 is an exemplary block diagram illustrating a connection reset component.

FIG. 4 is an exemplary block diagram illustrating a connection reset component 122. In some examples, a status component 402 analyzes dynamic server performance data 404 associated with each server in the plurality of servers in real-time with a set of user-configured threshold failure criteria 406 to identify the status 132 of each server. The threshold failure criteria is configured to make sure a server goes to inactive status only when a threshold failure rate is crossed. This provides improved control to applications to define customized conditions for changing server status.

A connection manager 408 assigns a configurable wait time-period 128 to each server in the plurality of servers having an inactive status. Each server having the inactive status is removed from a distribution rotation 410 for the configurable wait time-period 128. The distribution rotation 410 is the rotation of servers receiving requests from the connection reset component 122.

In some examples, a selection component 412 identifies a next available server 414 in a set of active servers based on a per-client set of user-selected distribution configurations 416 associated with an identified client and status 132 of each server in the plurality of servers on condition a request is received from the identified client. The user-selected distribution configurations 416 includes a set of priorities 130 assigned to the plurality of servers and a per-client distribution rotation methodology 304 associated with the identified client. The distribution rotation methodology 304 is the type of algorithm (method) by which servers are placed into a rotation. The distribution rotation methodology 304 can include, without limitation, a priority-based rotation, round robin rotation, etc.

A routing component 420 in other examples sends the next received request 422 from the identified client to the identified next available server 414 for that identified client. The next available server 414 which receives the request is connected to the requesting client and sends the response(s) to the next received request 422 directly back to the identified client.

Figure 5:
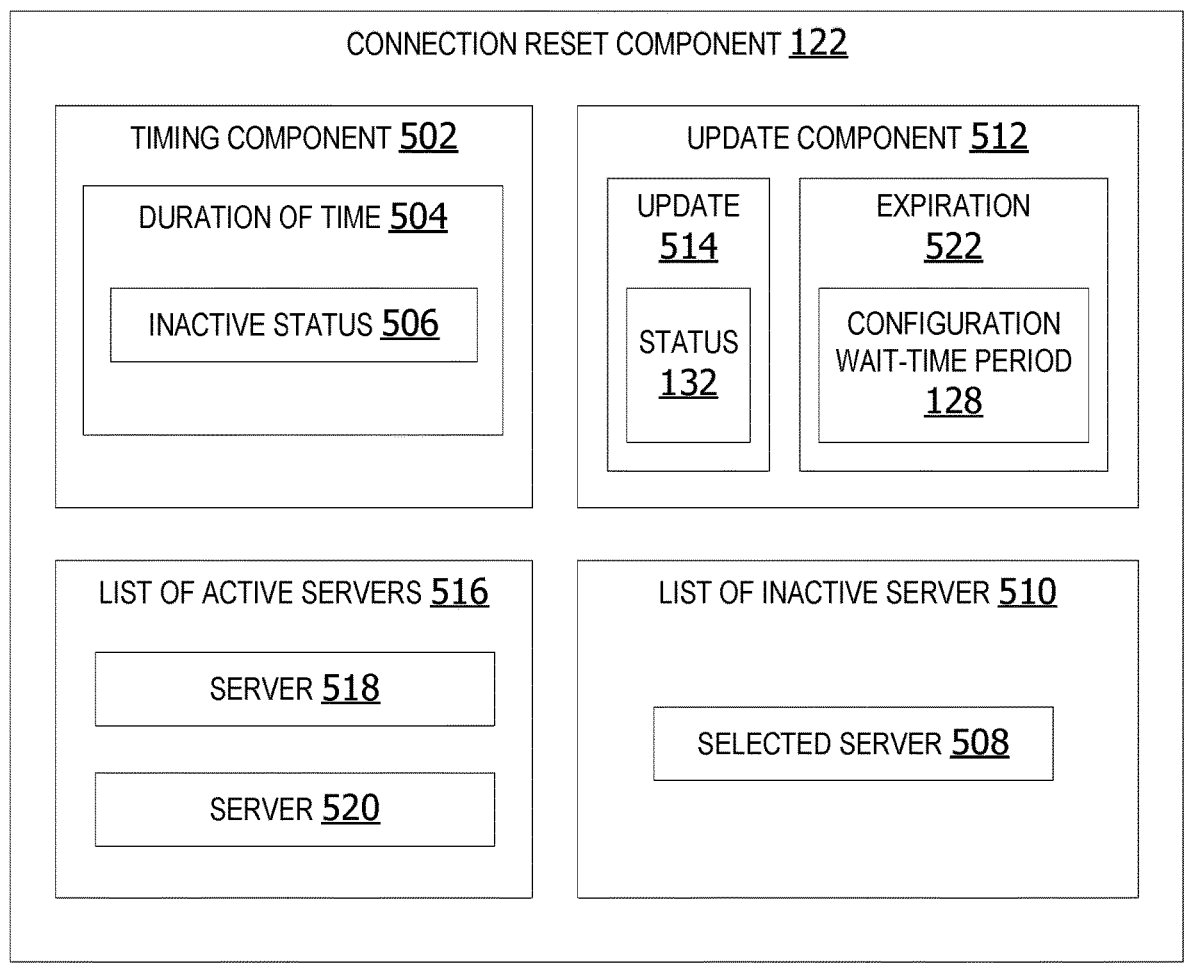
FIG. 5 is an exemplary block diagram illustrating a connection reset component monitoring per-server configurable wait time-period for inactive servers.

FIG. 5 is an exemplary block diagram illustrating a connection reset component 122 monitoring per-server configurable wait time-period for inactive servers. In some examples, a timing component 502 monitors a duration of time 504 that a selected server 508 has spent with the inactive status 506. In other words, the duration of time 504 is the amount of time the selected server 508 has been on the list of inactive servers 510. The status 132 of the selected server 508 changes from the inactive status to active status on expiration of the configurable wait time-period 128.

The list of inactive servers 510 in this example includes a single inactive server. In other examples, the list of inactive servers 510 can include two or more servers.

The update component 512 performs an automatic update 514 of the status 132 of the selected server 508 from an inactive status to an active status on condition the server has remained inactive for the configurable wait time-period 128. When the status of the server changes back to active status, the server is placed on the list of active servers 516. In this non-limiting example, the list of active servers 516 includes a server 518 and a server 520. However, the examples are not limited to two active servers. The list of active servers 516 can include no active servers (null set), a single active server, as well as three or more active servers.

Figure 6:
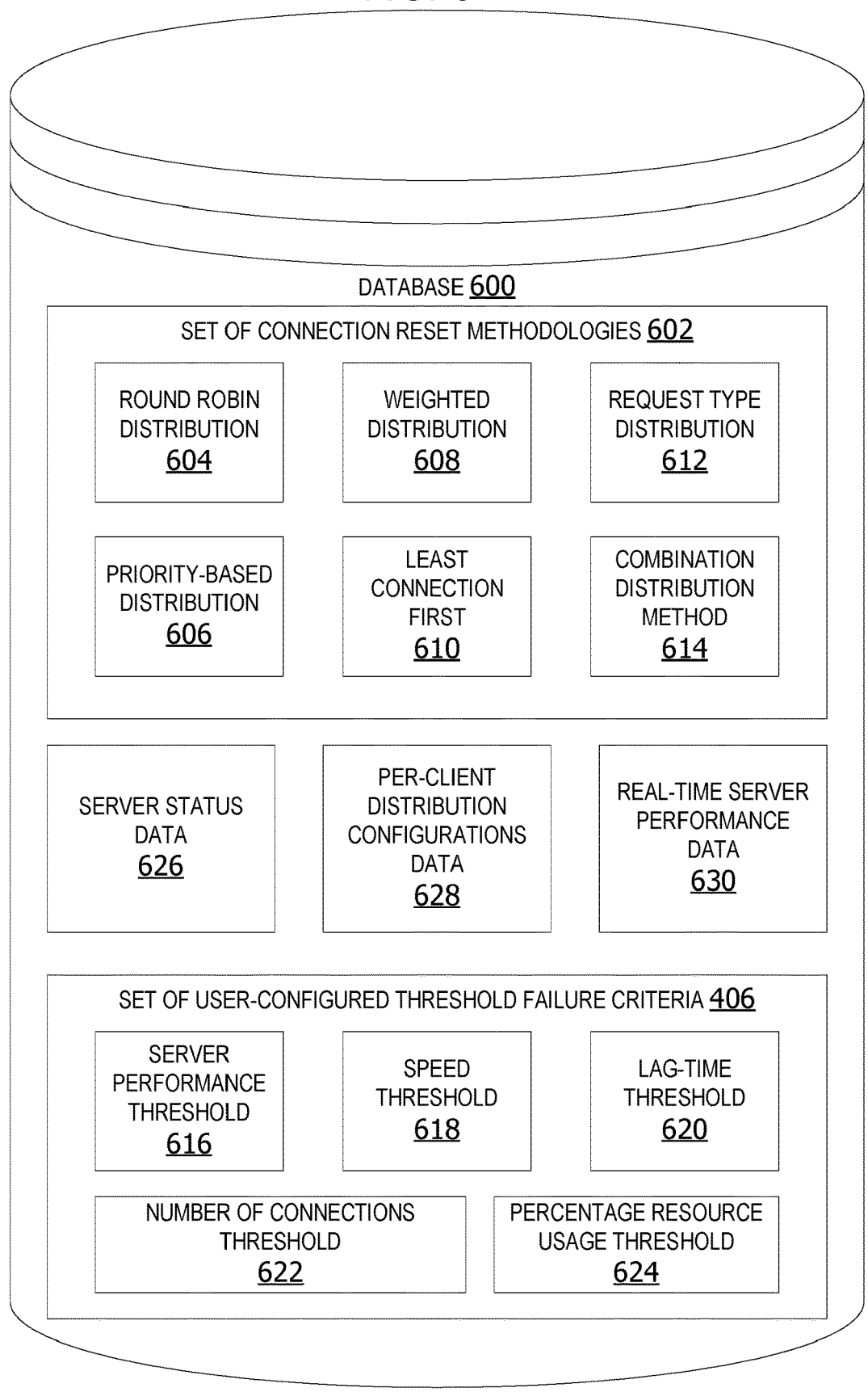
FIG. 6 is an exemplary block diagram illustrating a database storing data associated with customized load balancing by a connection reset component.

FIG. 6 is an exemplary block diagram illustrating a database 600 storing data associated with customized load balancing by a connection reset component. In this example, the database 600 stores a set of connection reset methodologies 602 selected by at least one user associated with the identified client. The set of connection reset methodologies 602 can include at least one distribution rotation methodology. A distribution rotation methodology in the set of connection reset methodologies can include a round robin distribution 604, a priority-based distribution 606, weighted distribution 608, least connection first 610, request-type distribution 612 and/or a combination distribution method 614.

A round robin distribution routes requests to servers in a given order. For example, if there are two servers in a round robin distribution the requests are sent to the first server, the second server and then back to the first server in a round robin fashion. A priority-based distribution routes requests to highest priority servers first and lower priority servers when the higher priority server is unavailable. A weighted distribution permits routing requests based on weights assigned to each server. A least connection first distribution rotation methodology routes requests to the server having the fewest connections (fewest active requests). A request-type distribution routes requests to each server based on the type of request. For example, write/post requests may be routed to one server preferentially while read requests are routed to one or more other servers.

The combination distribution method 614 is a combination of two or more of the other distribution rotation methodologies. For example, a combination distribution method can include a combination of round-robin and priority-based distribution in which requests are routed to servers in a round robin algorithm taking into account server priorities.

The connection reset component enables distributing traffic among a list of active servers using different distribution algorithms which is configurable. The default distribution rotation methodology in some examples is a round robin method.

The set of user-configured threshold failure criteria 406 includes criteria for determining when a server is active or inactive. The criteria can include, for example, but without limitation, a server performance threshold 616, a speed threshold 618, a lag-time threshold 620, a number of connections threshold 622 and/or a percentage resource usage threshold 624. When failure threshold for a server is breached, the server is moved to the inactive (unavailable) server list.

The data can also include, without limitation, server status data 626, per-client distribution configurations 628 and/or real-time server performance data 630. The server status data 626 is data indicating status of each server. The distribution configurations data indicates configurable settings for distributing requests, such as, but not limited to, server priorities, selected distribution method/algorithm, etc. The real-time server performance data 630 includes metric data associated with server performance.

Figure 7:
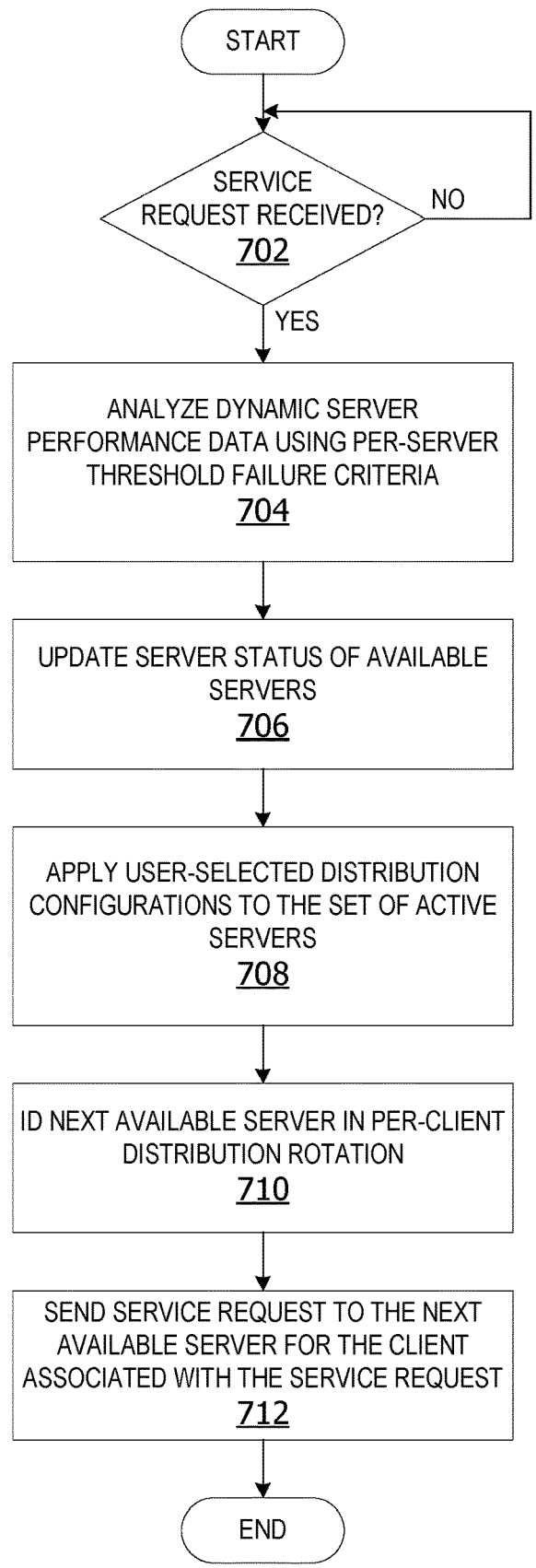
FIG. 7 is an exemplary flow chart illustrating operation of the computing device to route requests to servers based on per-client and per-server customized configurations.

FIG. 7 is an exemplary flow chart illustrating operation of the computing device to route requests to servers based on per-client and per-server customized configurations. The process shown in FIG. 7 is performed by a connection reset component, executing on a computing device, such as the computing device 102 in FIG. 1.

The process begins when the connection reset component receives a service request at 702. The connection reset component analyzes dynamic server performance data using per-server threshold failure criteria at 704. The connection reset component updates server status of available servers at 706. The connection reset component applies user-selected distribution configurations to the set of active servers at 708. The connection reset component identifies the next available server in per-client distribution rotation at 710. The per-client distribution rotation is a distribution rotation methodology selected by a user for a particular client. The connection reset component sends the service request to the next available server for the client associated with the service request at 712. The process terminates thereafter.

While the operations illustrated in FIG. 7 are performed by a computing device, aspects of the disclosure contemplate performance of the operations by other entities. In a non-limiting example, a cloud service performs one or more of the operations.

Figure 8:
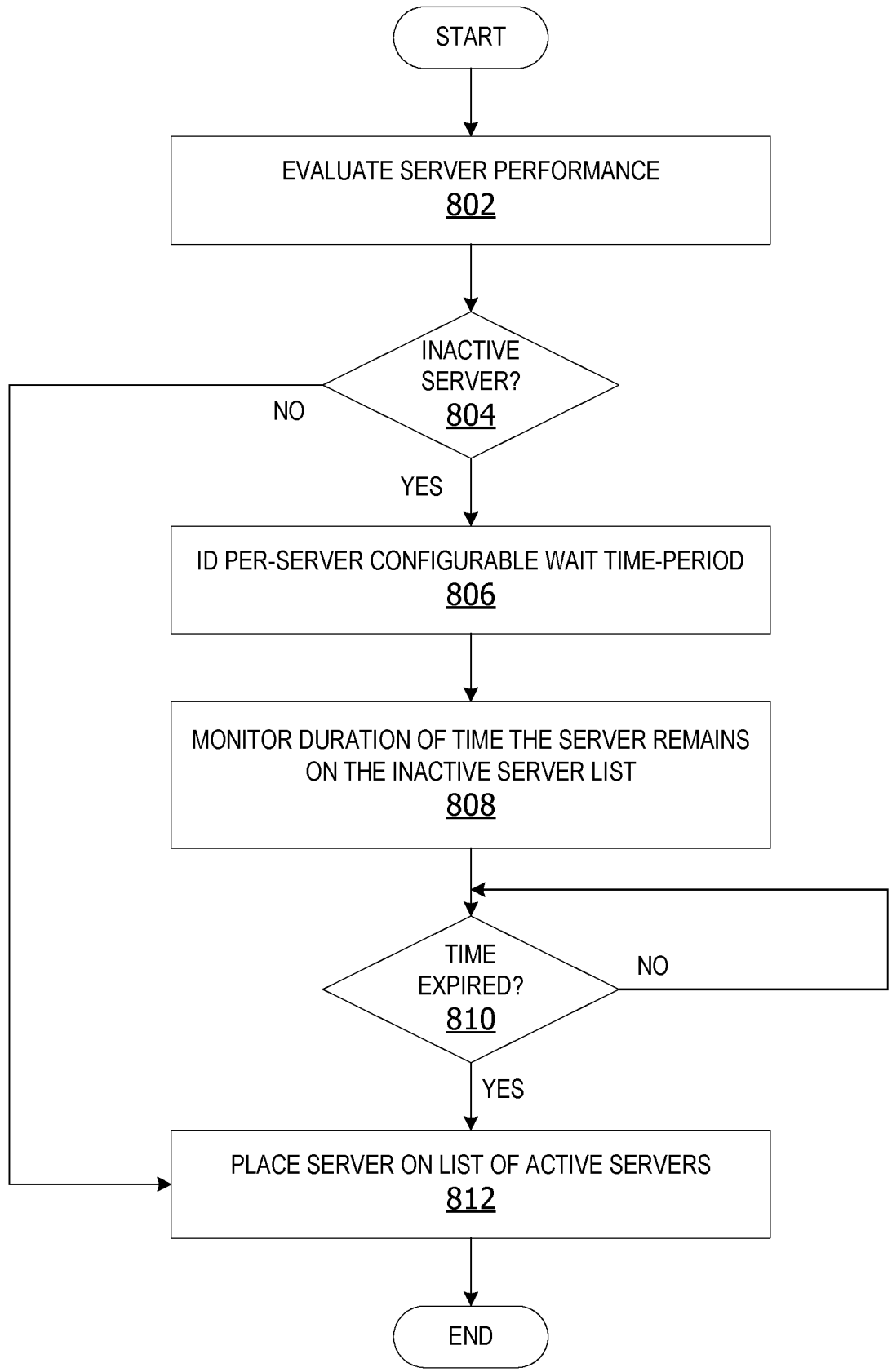
FIG. 8 is an exemplary flow chart illustrating operation of the computing device to monitor duration of inactive server status.

FIG. 8 is an exemplary flow chart illustrating operation of the computing device to monitor duration of inactive server status. The process shown in FIG. 8 is performed by a connection reset component, executing on a computing device, such as the computing device 102 in FIG. 1.

The connection reset component evaluates server performance data at 802 for each server in a plurality of servers. The connection reset component determines if a server is an inactive server at 804. If yes, the connection reset component identifies per-server configurable wait time-period at 806. The connection reset component monitors duration of time the server remains on the inactive server list at 808. The connection reset component determines if the wait time-period is expired at 810. If yes, the connection reset component places the server on a list of active servers at 812. The process terminates thereafter.

Returning to 804, if a server is not an inactive server the connection reset component places the server on the list of active servers at 812. The process terminates thereafter.

While the operations illustrated in FIG. 8 are performed by a computing device, aspects of the disclosure contemplate performance of the operations by other entities. In a non-limiting example, a cloud service performs one or more of the operations.

FIG. 9 is an exemplary table 900 illustrating distribution of requests to available servers in accordance with a selected distribution rotation methodology. The table 900 illustrates a round robin 902 methodology for distributing requests to a set of servers. The Run-1 output is the output after the feature is run the first time. The Run-2 output is the output after the feature is run the second time. In this example, requests are routed to a set of five servers in accordance with a round robin distribution method.

In the second column, all five servers are active. The incoming traffic is routed to the servers in order. Thus, a first request goes to server 1, second request to server 2, third request to server 3, fourth request to server 4, fifth request to server 5, sixth request to server 1, etc.

In the third column, server 4 is an inactive server (inactive state) and taken out of the rotation. Therefore, the first request goes to server 1, second request to server 2, third request to server 3, fourth request to server 5, fifth request to server 1, etc.

In the fourth column, both server 1 and server 4 are inactive and taken out of the distribution rotation. The first request goes to server 2, the second request goes to server 3, the third request goes to server 5, the fourth request goes to server 2, etc.

In the fifth column, only server 2 is an active server. All the other servers have been placed onto the inactive server list. In this example, every incoming request is routed to server 2 which is the only server available to take requests until the wait time-period for each inactive server expires.

The table 900 also includes a distribution of requests in accordance with a priority-based 904 methodology. The distribution rotation methodology in this example is a priority-based distribution methodology. In column 2, all hosts are in the active server list. The highest priority server is server 2. Therefore, the first request is routed to the highest priority server 2, the second request goes to server 1, the third request goes to server 3, the fourth request goes to server 2, etc.

In column three, server 4 is inactive. The first request goes to server 2, the second request goes to server 1, the third request goes to server 3, the next request goes to server 2, server 4 is skipped and the next request goes to server 5.

In the fourth column, both server 1 and server 4 are inactive. The first request goes to the highest priority server 2. Server 1 is skipped and the next request goes to server 3. The next request goes to server 5 (server 4 skipped). The next request goes back to server 2, etc.

In the last column, only server 2 is available as an active server. All incoming requests are routed to server 2 until another server becomes available.

In other examples, another customized distribution strategy can be implemented. The system can capture error for a host and keep it out of the rotation loop for a certain period of time and add it back once the host is returned to active status. Once back to active status, the server can serve incoming traffic.

ADDITIONAL EXAMPLES

In some examples, the system provides a round robin connect using different load balancing and connection reset methodologies. The connection reset enables a user to balance traffic flowing to multiple servers to make sure that a single server (or set of servers) is/are not overloaded with heavy traffic.

In some examples, the connection reset component maintains state of each server as active/in-active based on servers active/in-active condition check. Based on server status, only active servers get traffic. Inactive servers are kept out of the request routing loop for a configurable time-period. At expiration of the configurable wait time-period, these servers are checked again for active state and added back into the list of active servers accordingly.

In other examples, an event failure threshold is configured to ensure a server goes to in-active state only when a threshold failure rate is crossed. This provides greater control to an application to define such custom conditions.

In yet other examples, the system distributes client traffic (requests) among servers on a list of active servers using different algorithms (configurable). The default is a round-robin. Other algorithm options can be active-passive and priority-based routing of requests to servers.

In an example scenario, applications send requests and get replies from one or more servers. A server in a set of servers can be too busy to service additional requests. In some cases, a server may not respond for a while (response lag time). A load balancer can be used to route incoming traffic to multiple servers in accordance with customized routing methods selected for each application/client. The connection reset also determines which server to route request to in accordance with server failure criteria customized for each server and/or each type of request. If a server is down (inactive status), the connection reset does not attempt to send new requests to the server until the configurable threshold wait time-period has expired for that server. As long as the server is down (inactive), this takes server out of the rotation for a predetermined time period. Do not try the server until the time is up/expires. If server is still down (inactive), the server is removed from the distribution rotation for the duration of the configurable wait time-period. This reduces lag time, response time, eliminates/reduces denial of service or no response.

The server failure criteria in some examples specifies when a selected server is placed on the inactive server list. In an example scenario, a server can be inactive if it is operating at 70 percent capacity/limit (resource usage threshold). In another example, the configurations can specify a selected server does not receive GET requests or POST requests because these type of requests take longer to service.

Each client can specify different priorities/wait times, etc. Requests from one client are handled differently than requests from another client. One client s customized configurations specify that server 2 is highest priority and a different second client says server 4 has highest priority. If a server is inactive, it is inactive for all clients until the timeout time expires. But each individual client customizes priorities on a per-client basis. If all servers are down, then requests are placed into a queue until the wait time is over and at least one server is placed back onto the active server list.

Alternatively, or in addition to the other examples described herein, examples include any combination of the following:

- a timing component, implemented on the at least one processor, monitors a duration of time on a selected inactive server has had the inactive status, wherein the status of the server changes from the inactive status to active status on expiration of the configurable wait time-period;
- the update component, implemented on the at least one processor, updates the status of a selected server from an inactive status to an active status on condition the server has remained inactive for the configurable wait time-period;
- a set of connection reset methodologies selected by at least one user associated with the identified client, wherein the set of connection reset methodologies further comprises at least one of a round robin distribution, a priority-based distribution, weighted distribution, least connection first or request-type distribution;
- wherein the set of user-configured threshold failure criteria further comprises at least one of a server performance threshold, a speed threshold, a lag-time threshold, a number of connections threshold or a percentage resource usage threshold;
- a database associated with the data storage device, the database storing a list of active servers and a list of inactive servers, wherein the list of active servers and the list of inactive servers are updated dynamically based on real-time server performance data;
- a first set of user-selected distribution configurations associated with a first client and a second set of user-selected distribution configurations associated with a second client;
- wherein a first request received from the first client is routed in accordance with a rotation methodology identified based on the first set of user-selected distribution configurations and a second request received from the second client is routed in accordance with a different rotation methodology identified based on the second set of user-selected distribution configurations;

a first set of threshold failure criteria associated with a first server in the plurality of servers;
a second set of threshold failure criteria associated with a second server in the plurality of servers, wherein criteria applied to determine whether the first server has active status comprises at least one different criterion than the criteria applied to determine whether the second server has active status;
a first wait time-period assigned to a first server in the plurality of servers;
a second wait time-period assigned to a second server in the plurality of servers, wherein the first wait time-period is a different amount of time than the second wait time-period, wherein the first server remains on the list of inactive servers for a different duration of time than the second server;
receiving, via a communications interface component, a service request from an identified client device via a network;
analyzing, by a status component, dynamic server performance data associated with each server in a plurality of servers in real-time with a set of user-configured threshold failure criteria to update a set of available servers based on a status of each server;
identifying, by a selection component, a next available server in the set of active servers based on a set of user-selected distribution configurations associated with the identified client, the user-selected distribution configurations including a selected distribution rotation methodology associated with the identified client;
sending, by a routing component, the service request to the identified next available server;
assigning, by a connection manager, a configurable wait time-period to each server in the plurality of servers having an inactive status, wherein each server having the inactive status is removed from a distribution rotation for the configurable wait time-period;
monitoring, by a timing component, a duration of time on a selected inactive server has had the inactive status, wherein the status of the server changes from the inactive status to active status on expiration of the configurable wait time-period;
wherein the selected rotation methodology further comprises at least one of a round robin distribution, a priority-based distribution, weighted distribution, least connection first or request-type distribution;
routing a first request received from a first client in accordance with a first set of user-selected distribution configurations associated with the first client;
routing a second request received from a second client in accordance with a second set of user-selected distribution configurations associated with the second client;
wherein the first request received from the first client is routed in accordance with a first rotation methodology identified based on the first set of user-selected distribution configurations and the second request received from the second client is routed in accordance with a different second rotation methodology identified based on the second set of user-selected distribution configurations;
changing a status of a first server from active status to inactive status based on a first set of threshold failure criteria associated with the first server in the plurality of servers;
changing a status of a second server from active status to inactive status based on a second set of threshold failure criteria associated with the second server in the plurality of servers, wherein criteria applied to determine whether the first server has active status comprises at least one different criterion than the criteria applied to determine whether the second server has active status;
placing a first server on a list of inactive servers for a first wait time-period;
placing a second server on the list of inactive servers for a second wait time-period, wherein the first wait time-period is a different amount of time than the second wait time-period, wherein the first server remains on the list of inactive servers for a different duration of time than the second server;
receiving a plurality of service requests from a plurality of client devices via a network; analyzing dynamic server performance data associated with each server in a plurality of servers in real-time using a set of user-configured threshold failure criteria to identify a status of each server; removing a set of inactive servers from a list of active servers based on the server status of each server in the plurality of servers;
assigning a configurable wait time-period to each server in the plurality of servers having an inactive status, wherein each server having the inactive status is removed from a distribution rotation for the configurable wait time-period; selecting a next available server from a set of active servers on the list of active servers based on the distribution rotation and a per-client set of user-selected distribution configurations associated with an identified client on condition a request is received from the identified client; and sending the request to the selected next available server;
wherein the connection reset component, when further executed by a computer, cause the computer to perform operations comprising routing a first request received from a first client in accordance with a first set of user-selected distribution configurations associated with the first client; and routing a second request received from a second client in accordance with a second set of user-selected distribution configurations associated with the second client, wherein the first request received from the first client is routed in accordance with a first rotation methodology identified based on the first set of user-selected distribution configurations and the second request received from the second client is routed in accordance with a different second rotation methodology identified based on the second set of user-selected distribution configurations;
changing a status of a first server from active status to inactive status based on a first set of threshold failure criteria associated with the first server in the plurality of servers; and changing a status of a second server from active status to inactive status based on a second set of threshold failure criteria associated with the second server in the plurality of servers, wherein criteria applied to determine whether the first server has active status comprises at least one different criterion than the criteria applied to determine whether the second server has active status;
placing a first server on a list of inactive servers for a first wait time-period; and
placing a second server on the list of inactive servers for a second wait time-period, wherein the first wait time-period is a different amount of time than the second wait time-period, wherein the first server remains on the list of inactive servers for a different duration of time than the second server.

At least a portion of the functionality of the various elements in FIG. 1, FIG. 2, FIG. 3, FIG. 4, FIG. 5 and FIG. 6 can be performed by other elements in FIG. 1, FIG. 2, FIG. 3, FIG. 4, FIG. 5 and FIG. 6, or an entity (e.g., processor 106, web service, server, application program, computing device, etc.) not shown in FIG. 1, FIG. 2, FIG. 3, FIG. 4, FIG. 5 and FIG. 6.

In some examples, the operations illustrated in FIG. 7 and FIG. 8 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method of routing requests to active servers in accordance with user configured criteria, the method comprising receiving a service request from an identified client device via a network; analyzing dynamic server performance data associated with each server in a plurality of servers in real-time with a set of user-configured threshold failure criteria to update a set of available servers based on a status of each server; identifying a next available server in the set of active servers based on a set of user-selected distribution configurations associated with the identified client, the user-selected distribution configurations including a selected distribution rotation methodology associated with the identified client; and sending the service request to the identified next available server.

While the aspects of the disclosure have been described in terms of various examples with their associated operations, a person skilled in the art would appreciate that a combination of operations from any number of different examples is also within scope of the aspects of the disclosure.

The term 'Wi-Fi as used herein refers, in some examples, to a wireless local area network using high frequency radio signals for the transmission of data. The term 'BLUETOOTH® as used herein refers, in some examples, to a wireless technology standard for exchanging data over short distances using short wavelength radio transmission. The term 'NFC as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for customized load balancing by a connection reset component. For example, the elements illustrated in FIG. 1, FIG. 2, FIG. 3, FIG. 4, FIG. 5 and FIG. 6, such as when encoded to perform the operations illustrated in FIG. 7 and FIG. 8, constitute exemplary means for receiving a service request from an identified client device via a network; exemplary means for analyzing dynamic server performance data associated with each server in a plurality of servers in real-time with a set of user-configured threshold failure criteria to update a set of available servers based on a status of each server; exemplary means for identifying a next available server in the set of active servers based on a set of user-selected distribution configurations associated with the identified client, the user-selected distribution configurations including a selected type of distribution rotation methodology associated with the identified client; and exemplary means for sending the service request to the identified next available server.

Other non-limiting examples provide one or more computer storage devices having a first computer-executable instructions stored thereon for providing customized load balancing. When executed by a computer, the computer performs operations including receiving a plurality of service requests from a plurality of client devices via a network; analyzing dynamic server performance data associated with each server in a plurality of servers in real-time using a set of user-configured threshold failure criteria to identify a status of each server; removing a set of inactive servers from a list of active servers based on the server status of each server in the plurality of servers; assigning a configurable wait time-period to each server in the plurality of servers having an inactive status, wherein each server having the inactive status is removed from a distribution rotation for the configurable wait time-period; selecting a next available server from a set of active servers on the list of active servers based on the distribution rotation and a per-client set of user-selected distribution configurations associated with an identified client on condition a request is received from the identified client; and sending the request to the next available server.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term 'exemplary is intended to mean 'an example of. The phrase 'one or more of the following: A, B, and C means 'at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for customized distribution of incoming traffic to a plurality of servers, the system comprising:
   a memory;
   at least one processor communicatively coupled to the memory;
   a communications interface component, implemented on the at least one processor, receives a plurality of service requests from a plurality of client devices via a network;
   a status component, implemented on the at least one processor, analyzes dynamic server performance data associated with each server in a plurality of servers in real-time with a set of user-configured threshold failure criteria to identify a status of each server;
   a data storage device stores a status of each server in the plurality of servers, the status comprising an active status or an inactive status;
   a connection manager, implemented on the at least one processor, assigns a configurable wait time-period to each server in the plurality of servers having an inactive status and removes each server having the inactive status from a distribution rotation for the configurable wait time-period, wherein the inactive status of the each server changes to the active status responsive to an expiration of the configurable wait time-period;

a selection component, implemented on the at least one processor, identifies a next available server in a set of active servers based on a per-client set of user-selected distribution configurations associated with an identified client and status of each server in the plurality of servers on condition a request is received from the identified client, the per-client user-selected distribution configurations including a set of server priorities assigned to the plurality of servers and a selected distribution rotation method associated with the identified client; and a routing component, implemented on the at least one processor, sends a next received request to the identified next available server for the identified client.

2. The system of claim 1, further comprising:
a timing component, implemented on the at least one processor, monitors a duration of time a selected inactive status.

3. The system of claim 1, further comprising:
an update component, implemented on the at least one processor, updates the status of a selected server from an inactive status to an active status on condition the server has remained inactive for the configurable wait time-period.

4. The system of claim 1, wherein the per-client user-selected distribution configurations further comprises:
a set of connection reset methodologies associated with the identified client, wherein the set of connection reset methodologies further comprises at least one of a round robin distribution, a priority-based distribution, weighted distribution, least connection first, a request-type distribution or a combination distribution method.

5. The system of claim 1, wherein the set of user-configured threshold failure criteria further comprises at least one of a server performance threshold, a speed threshold, a lag-time threshold, a number of connections threshold or a percentage resource usage threshold.

6. The system of claim 1, further comprising:
a database associated with the data storage device, the database storing a list of active servers and a list of inactive servers, wherein the list of active servers and the list of inactive servers are updated dynamically based on real-time server performance data.

7. The system of claim 1, further comprising:
a first set of user-selected distribution configurations associated with a first client and a second set of user-selected distribution configurations associated with a second client, wherein a first request received from the first client is routed in accordance with a distribution rotation method identified based on the first set of user-selected distribution configurations and a second request received from the second client is routed in accordance with a different rotation methodology identified based on the second set of user-selected distribution configurations.

8. The system of claim 1, wherein the set of user-configured threshold failure criteria further comprises:
a first set of threshold failure criteria associated with a first server in the plurality of servers; and
a second set of threshold failure criteria associated with a second server in the plurality of servers, wherein the first set of threshold failure criteria applied to determine whether the first server has active status is different than the second set of threshold failure criteria applied to determine whether the second server has active status.

9. The system of claim 1, wherein the configurable wait time-period further comprises:
a first wait time-period assigned to a first server in the plurality of servers; and
a second wait time-period assigned to a second server in the plurality of servers, wherein the first wait time-period is a different amount of time than the second wait time-period, wherein the first server remains on a list of inactive servers for a different duration of time than the second server.

10. A computer-implemented method for customized distribution of incoming traffic to a plurality of servers, the method comprising:
receiving, via a communications interface component, a service request from an identified client device via a network;
analyzing, by a status component, dynamic server performance data associated with each server in a plurality of servers in real-time with a set of user-configured threshold failure criteria to update a set of available servers based on a status of each server;
assigning, by a connection manager, a configurable wait time-period to each server in the plurality of servers having an inactive status and removes each server having the inactive status from a distribution rotation for the configurable wait time-period, wherein the inactive status of the each server changes to an active status responsive to an expiration of the configurable wait time-period;
identifying, by a selection component, a next available server in the set of active available servers based on a set of user-selected distribution configurations associated with the identified client, the user-selected distribution configurations including a selected rotation method associated with the identified client; and
sending, by a routing component, the service request to the identified next available server.

11. The computer-implemented method of claim 10, further comprising:
determining, by a connection reset component, the configurable wait time-period for the each server in the plurality of servers having the inactive status has expired, and
changing, by the connection reset component, the status of the each server in the plurality of servers having the inactive status from inactive to active.

12. The computer-implemented method of claim 11, further comprising:
monitoring, by a timing component, a duration of time on a selected inactive server has had the inactive status.

13. The computer-implemented method of claim 11, wherein the selected distribution rotation method further comprises at least one of a round robin distribution, a priority-based distribution, weighted distribution, least connection first or request-type distribution.

14. The computer-implemented method of claim 11, further comprising:
routing a first request received from a first client in accordance with a first set of user-selected distribution configurations associated with the first client; and
routing a second request received from a second client in accordance with a second set of user-selected distribution configurations associated with the second client, wherein the first request received from the first client is routed in accordance with a first distribution rotation method identified based on the first set of user-selected distribution configurations and the second request received from the second client is routed in accordance with a different second distribution rotation method identified based on the second set of user-selected distribution configurations.

15. The computer-implemented method of claim 11, further comprising:
    changing a status of a first server from active status to inactive status based on a first set of threshold failure criteria associated with the first server in the plurality of servers; and
    changing a status of a second server from active status to inactive status based on a second set of threshold failure criteria associated with the second server in the plurality of servers, wherein criteria applied to determine whether the first server has active status comprises at least one different criterion than the criteria applied to determine whether the second server has active status.

16. The computer-implemented method of claim 11, further comprising:
    placing a first server on a list of inactive servers for a first wait time-period; and
    placing a second server on the list of inactive servers for a second wait time-period, wherein the first wait time-period is a different amount of time than the second wait time-period, wherein the first server remains on the list of inactive servers for a different duration of time than the second server.

17. One or more computer storage devices, having computer-executable instructions for customized distribution of incoming traffic to a plurality of servers by a connection reset component, that, when executed by a computer cause the computer to perform operations comprising:
    receiving a plurality of service requests from a plurality of client devices via a network;
    analyzing dynamic server performance data associated with each server in a plurality of servers in real-time using a set of user-configured threshold failure criteria to identify a status of each server;
    removing a set of inactive servers from a list of active servers based on the status of the each server in the plurality of servers;
    assigning a configurable wait time-period to each server in the plurality of servers having an inactive status and removing each server having the inactive status from a distribution rotation for the configurable wait time-period, wherein the inactive status of the each server changes to an active status responsive to an expiration of the configurable wait time-period;
    selecting a next available server from a set of active servers on the list of active servers based on the distribution rotation and a per-client set of user-selected distribution configurations associated with an identified client on condition a request is received from the identified client; and
    sending the request to the selected next available server.

18. The one or more computer storage devices of claim 17, wherein the connection reset component, when further executed by a computer, cause the computer to perform operations comprising:
    routing a first request received from a first client in accordance with a first set of user-selected distribution configurations associated with the first client; and
    routing a second request received from a second client in accordance with a second set of user-selected distribution configurations associated with the second client, wherein the first request received from the first client is routed in accordance with a first distribution rotation method identified based on the first set of user-selected distribution configurations and the second request received from the second client is routed in accordance with a different second distribution rotation method identified based on the second set of user-selected distribution configurations.

19. The one or more computer storage devices of claim 17, wherein the connection reset component, when further executed by a computer, cause the computer to perform operations comprising:
    changing a status of a first server from active status to inactive status based on a first set of threshold failure criteria associated with the first server in the plurality of servers; and
    changing a status of a second server from active status to inactive status based on a second set of threshold failure criteria associated with the second server in the plurality of servers, wherein criteria applied to determine whether the first server has active status comprises at least one different criterion than the criteria applied to determine whether the second server has active status.

20. The one or more computer storage devices of claim 17, wherein the connection reset component, when further executed by a computer, cause the computer to perform operations comprising:
    placing a first server on a list of inactive servers for a first wait time-period; and
    placing a second server on the list of inactive servers for a second wait time-period, wherein the first wait time-period is a different amount of time than the second wait time-period, wherein the first server remains on the list of inactive servers for a different duration of time than the second server.

* * * * *